(12) United States Patent
Hosseini et al.

(10) Patent No.: US 11,632,744 B2
(45) Date of Patent: Apr. 18, 2023

(54) HYBRID AUTOMATIC REPEAT REQUEST FEEDBACK FOR A SIDELINK

(71) Applicant: QUALCOMM Incorporated, San Diego, CA (US)

(72) Inventors: Seyedkianoush Hosseini, San Diego, CA (US); Wei Yang, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 17/247,613

(22) Filed: Dec. 17, 2020

(65) Prior Publication Data
US 2022/0201670 A1  Jun. 23, 2022

(51) Int. Cl.
*H04W 72/04* (2009.01)
*H04L 1/1812* (2023.01)
*H04W 72/0453* (2023.01)

(52) U.S. Cl.
CPC ....... *H04W 72/0406* (2013.01); *H04L 1/1812* (2013.01); *H04W 72/0453* (2013.01)

(58) Field of Classification Search
CPC ........... H04W 84/025; H04W 72/0406; H04W 72/0453; H04L 2012/6497; H04L 1/1812
See application file for complete search history.

(56) References Cited

U.S. PATENT DOCUMENTS

| | | | |
|---|---|---|---|
| 2018/0054285 A1* | 2/2018 | Chen | H04L 1/1896 |
| 2018/0098349 A1* | 4/2018 | Sun | H04W 72/0406 |
| 2018/0124753 A1* | 5/2018 | Sun | H04W 72/042 |
| 2019/0239118 A1* | 8/2019 | Baghel | H04L 5/0053 |
| 2020/0084659 A1* | 3/2020 | Pan | H04W 76/15 |
| 2020/0221271 A1* | 7/2020 | Kim | H04L 27/2601 |
| 2020/0351057 A1* | 11/2020 | Yeo | H04W 72/02 |
| 2020/0403737 A1* | 12/2020 | Yeo | H04W 52/383 |
| 2021/0007096 A1* | 1/2021 | Huang | H04W 72/02 |
| 2021/0045100 A1* | 2/2021 | Park | H04W 72/0413 |
| 2021/0050950 A1* | 2/2021 | Zhou | H04L 1/1861 |
| 2021/0050953 A1* | 2/2021 | Park | H04L 5/0094 |
| 2021/0160822 A1* | 5/2021 | Hassan | H04W 4/90 |

(Continued)

OTHER PUBLICATIONS

"HARQ feedback optimization for improved reliability in Cellular Vehicle to Everything"; Leibel et al.; 2020 International Wireless Communications and Mobile Computing (IWCMC); Jun. 15-19, 2020 (Year: 2020).*

(Continued)

*Primary Examiner* — Benjamin H Elliott, IV
(74) *Attorney, Agent, or Firm* — Harrity & Harrity, LLP

(57) ABSTRACT

Various aspects of the present disclosure generally relate to wireless communication. In some aspects, a user equipment (UE) may receive data or control signaling on one or more first sidelink channels on a set of sidelink carriers. The UE may receive data or control signaling on one or more second sidelink channels on the set of sidelink carriers. The UE may transmit hybrid automatic repeat request (HARQ) feedback corresponding to the data or control signaling on the one or more first sidelink channels and the data or control signaling on the one or more second sidelink channels. Numerous other aspects are provided.

30 Claims, 13 Drawing Sheets

(56) References Cited

U.S. PATENT DOCUMENTS

| | | | | |
|---|---|---|---|---|
| 2021/0168762 A1* | 6/2021 | Huang | ............. | H04W 72/0446 |
| 2021/0176734 A1* | 6/2021 | You | ................... | H04W 72/085 |
| 2021/0377912 A1* | 12/2021 | El Hamss | ............. | H04L 1/1819 |
| 2022/0110094 A1* | 4/2022 | Huang | .................. | H04L 5/0055 |

OTHER PUBLICATIONS

Intel Corporation: "Sidelink Physical Layer Procedures for NR V2X Communication", 3GPP Draft, 3GPP TSG RAN WG1 Meeting #98bis, R1-1910653 Intel—EV2X_SL_L1_Procedure, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 8, 2019 (Oct. 8, 2019), XP051789445, XP051809173, 10 Pages, Retrieved from the Internet: URL: http://www.3gpp.org/ftp/tsg_ran/WG1_RL1/TSGR1_98b/Docs/R1-1910653.zip R1-1910653 Intel—eV2X_SL_L1_Procedure.docx [retrieved on Oct. 8, 2019] section 2.3.1, p. 5, lines 3-6, the whole document.

International Search Report and Written Opinion—PCT/US2021/072039—ISA/EPO—dated Feb. 22, 2022.

Spreadtrum Communications: "Remaining Issues in NR Sidelink Mode 1 Resource Allocation" , 3GPP Draft, R1-2002266, 3GPP TSG RAN WG1 #100bis, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 11, 2020 (Apr. 11, 2020), XP051875510, 6 Pages, Retrieved from the Internet: URL:https://ftp.3gpp.org/tsg_ran/WG1_RL1/TSGR1_100b_e/Docs/R1-2002266.zip R1-2002266 Remaining issues in NR sidelink mode 1 resource allocation.docx [retrieved on Arp. 11, 2020] the whole document.

\* cited by examiner

HYBRID AUTOMATIC REPEAT REQUEST FEEDBACK FOR A SIDELINK

FIELD OF THE DISCLOSURE

Aspects of the present disclosure generally relate to wireless communication and to techniques and apparatuses for hybrid automatic repeat request (HARQ) feedback for a sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the B S. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving data or control signaling on one or more first sidelink channels on a set of sidelink carriers; receiving data or control signaling on one or more second sidelink channels on the set of sidelink carriers; and transmitting hybrid automatic repeat request (HARD) feedback corresponding to the data or control signaling on the one or more first sidelink channels and the data or control signaling on the one or more second sidelink channels.

In some aspects, a method of wireless communication performed by a first UE includes transmitting, to a second UE, data or control signaling on one or more first sidelink channels on a first sidelink CC; transmitting, to the second UE, data or control signaling on one or more second sidelink channels on the set of sidelink carriers; and receiving, from the second UE, HARQ feedback corresponding to the data or control signaling on the one or more first sidelink channels and the data or control signaling on the one or more second sidelink channels.

In some aspects, a UE for wireless communication includes a memory; and one or more processors operatively coupled to the memory, the memory and the one or more processors configured to: receive data or control signaling on one or more first sidelink channels on a first sidelink CC; receive data or control signaling on one or more second sidelink channels on the set of sidelink carriers; and transmit HARQ feedback corresponding to the data or control signaling on the one or more first sidelink channels and the data or control signaling on the one or more second sidelink channels.

In some aspects, a first UE for wireless communication includes a memory; and one or more processors operatively coupled to the memory, the memory and the one or more processors configured to: transmit, to a second UE, data or control signaling on one or more first sidelink channels on a first sidelink CC; transmit, to the second UE, data or control signaling on one or more second sidelink channels on the set of sidelink carriers; and receive, from the second UE, HARQ feedback corresponding to the data or control signaling on the one or more first sidelink channels and the data or control signaling on the one or more second sidelink channels.

In some aspects, a non-transitory computer-readable medium storing a set of instructions for wireless communication includes one or more instructions that, when executed by one or more processors of a UE, cause the UE to: receive data or control signaling on one or more first sidelink channels on a first sidelink CC; receive data or control signaling on one or more second sidelink channels on the set of sidelink carriers; and transmit HARQ feedback corresponding to the data or control signaling on the one or more first sidelink channels and the data or control signaling on the one or more second sidelink channels.

In some aspects, a non-transitory computer-readable medium storing a set of instructions for wireless communication includes one or more instructions that, when executed by one or more processors of a first UE, cause the UE to: transmit, to a second UE, data or control signaling on one or more first sidelink channels on a first sidelink CC; transmit, to the second UE, data or control signaling on one or more second sidelink channels on the set of sidelink carriers; and receive, from the second UE, HARQ feedback corresponding to the data or control signaling on the one or more first sidelink channels and the data or control signaling on the one or more second sidelink channels.

In some aspects, an apparatus for wireless communication includes means for receiving data or control signaling on one or more first sidelink channels on a first sidelink CC;

means for receiving data or control signaling on one or more second sidelink channels on the set of sidelink carriers; and means for transmitting HARQ feedback corresponding to the data or control signaling on the one or more first sidelink channels and the data or control signaling on the one or more second sidelink channels.

In some aspects, an apparatus for wireless communication includes means for transmitting, to a second UE, data or control signaling on one or more first sidelink channels on a first sidelink CC; means for transmitting, to the second UE, data or control signaling on one or more second sidelink channels on the set of sidelink carriers; and means for receiving, from the second UE, HARQ feedback corresponding to the data or control signaling on the one or more first sidelink channels and the data or control signaling on the one or more second sidelink channels.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
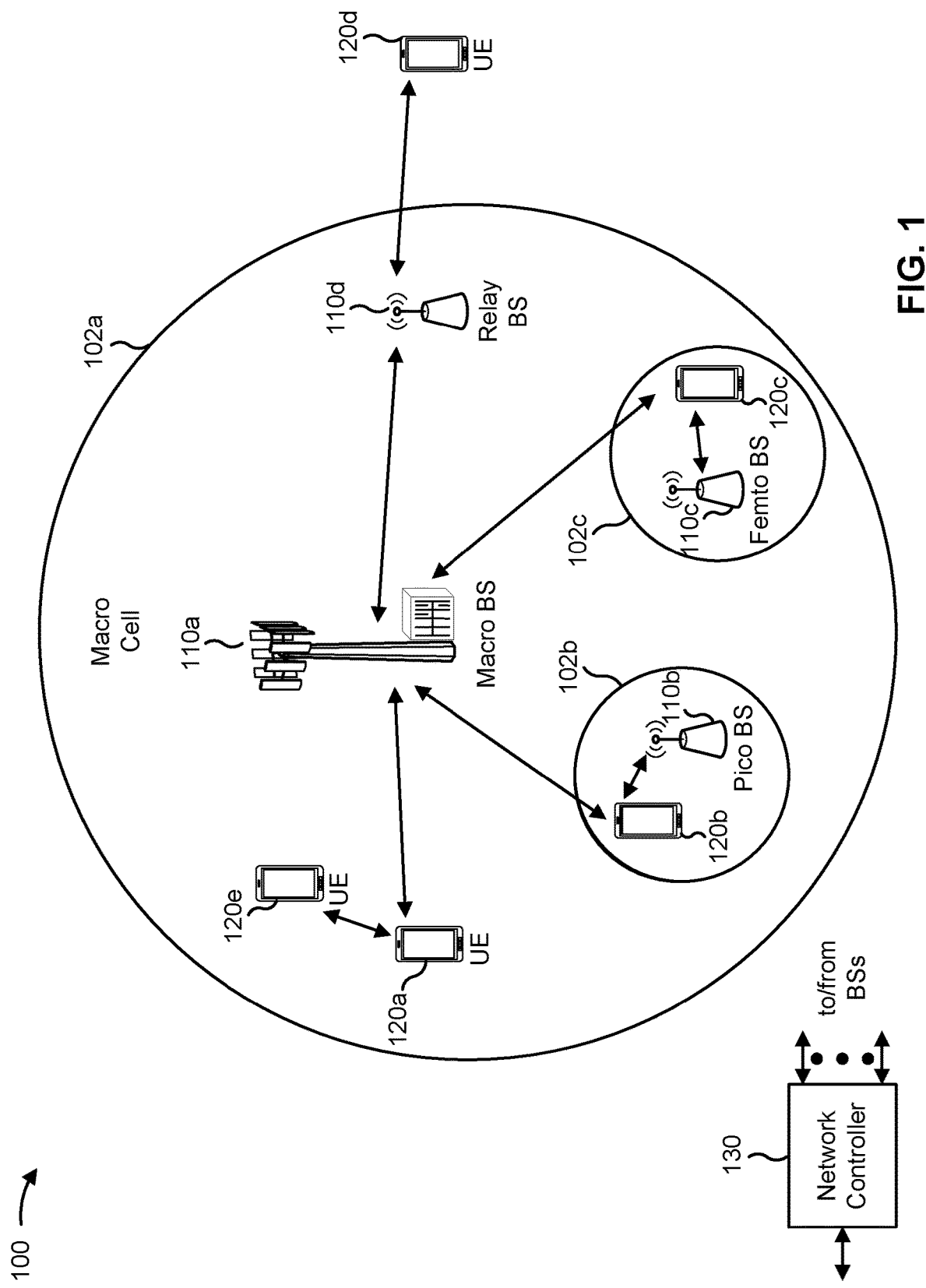
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
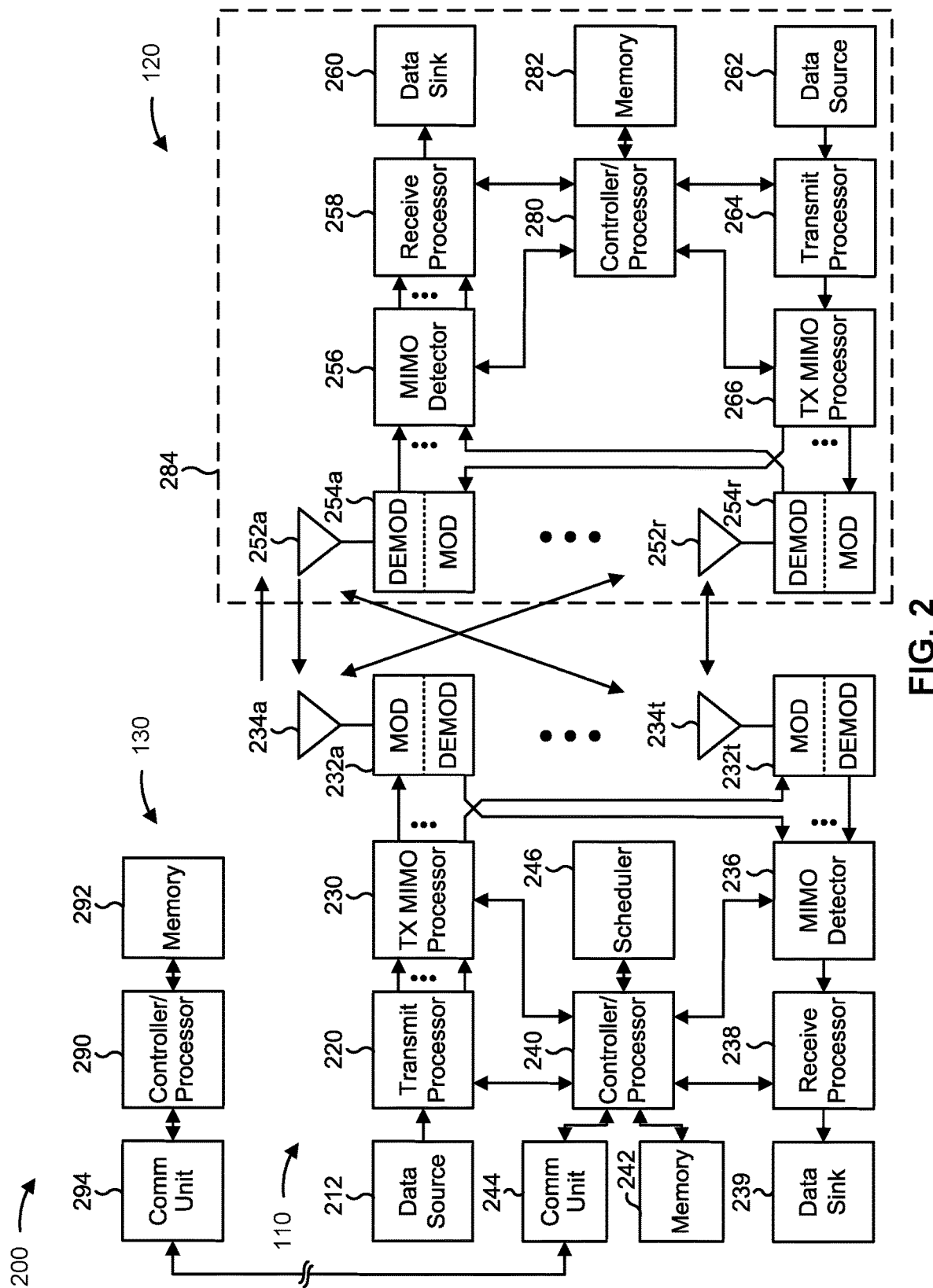
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-9.

Controller/processor 240 of base station 110, controller/processor 280 of UE 120, and/or any other component(s) of FIG. 2 may perform one or more techniques associated with hybrid automatic repeat request (HARD) feedback for a sidelink, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, a UE (e.g., UE 120) includes means for receiving data or control signaling on one or more first sidelink channels on a set of sidelink carriers; means for receiving data or control signaling on one or more second sidelink channels on the set of sidelink carriers; or means for transmitting HARQ feedback corresponding to the data or control signaling on the one or more first sidelink channels and the data or control signaling on the one or more second sidelink channels. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a first UE (e.g., UE 120) includes means for transmitting, to a second UE, data or control signaling on one or more first sidelink channels on a first sidelink CC; means for transmitting, to the second UE, data or control signaling on one or more second sidelink channels on the set of sidelink carriers; or means for receiving, from the second UE, HARQ feedback corresponding to the data or control signaling on the one or more first sidelink channels and the data or control signaling on the one or more second sidelink channels. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for setting one or more slot offsets associated with the one or more first sidelink channels or the one or more second sidelink channels, wherein the HARQ feedback includes, per carrier or per resource pool, N*Y bits, where Y is a maximum slot offset of the one or more slot offsets and N is an integer. Using N*Y may provide for multiple transport blocks per physical sidelink shared channel (PSSCH).

In some aspects, the first UE includes means for transmitting the sidelink assignment indicators (SAIs) via sidelink control information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
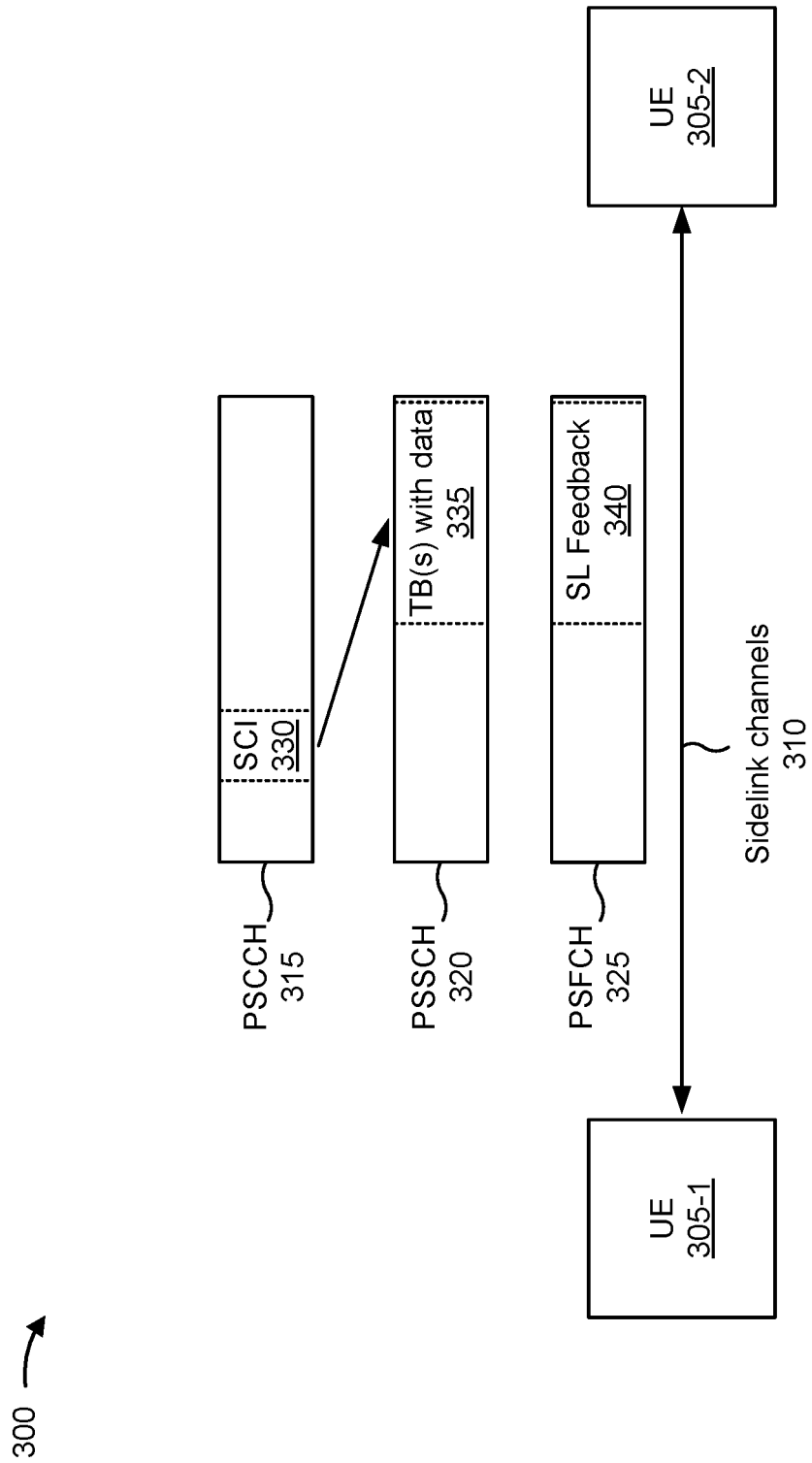
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a ProSe sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like)

where a transport block (TB) 335 may be carried on the PSSCH 320. The TB 335 may include data. The PSFCH 325 may be used to communicate sidelink feedback 340, such as HARQ feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
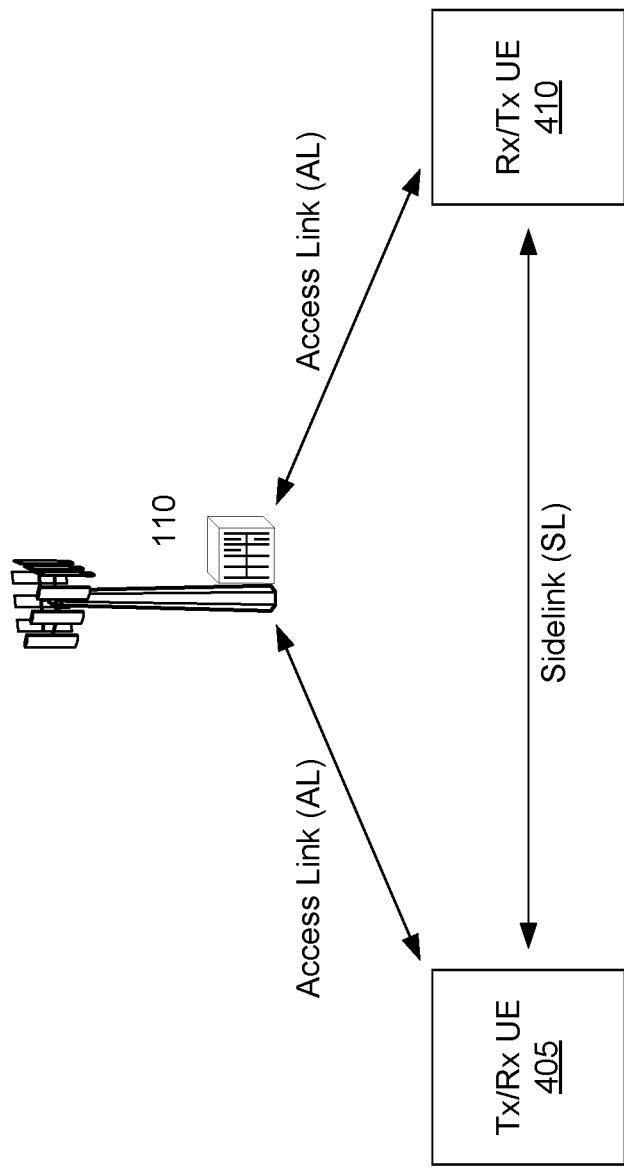
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
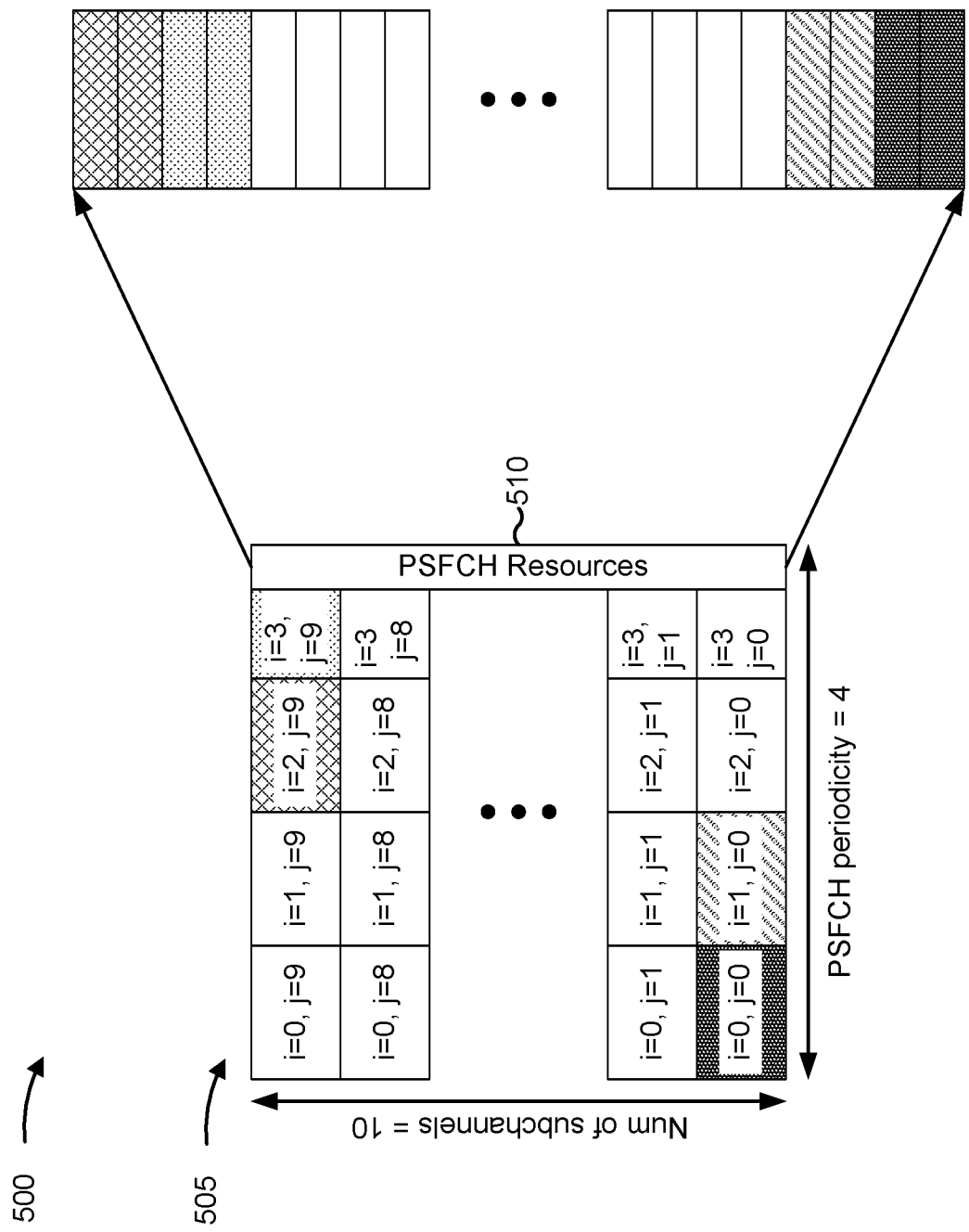
FIG. 5 is a diagram illustrating an example of sidelink feedback channel resource determination, in accordance with various aspects of the present disclosure.

FIG. 5 is a diagram illustrating an example 500 of sidelink feedback channel resource determination, in accordance with various aspects of the present disclosure. FIG. 5 shows a resource pool 505. The resource pool 505 includes 10 subchannels ($N_{subch}=10$), of which four are shown. A subchannel is a frequency-domain subset of a resource pool. A resource pool can be configured with one or more subchannels. In example 500, the resource pool is configured with a physical sidelink feedback channel (PSFCH) periodicity of 4 ($N_{PSSCH}^{PSFCH}=4$). A resource pool can be configured with a PSFCH periodicity, which indicates a periodicity of PSFCH transmissions associated with the resource pool. PSFCH resources 510 indicated by the PSFCH periodicity are in the fourth slot of the resource pool 505.

A UE may allocate a configured number of physical resource blocks (PRBs) for the PSFCH resources 510. In example 500, the UE may allocate 80 PRBs for the PSFCH resources 510 ($M_{PRB,set}^{PSFCH}=80$), A PRB is a group of subcarriers, and may include 12 subcarriers. Since there are 4 slots between each PSFCH resource (due to $N_{PSSCCH}^{PSFCH}$) and 10 subchannels in the resource pool (due to $N_{subch}$), each subchannel is associated with 2 of the 80 PSFCH PRBs (e.g., 80 PRBs/(4 slots*10 subchannels)=2 PRBs). In this case, sidelink feedback for a subchannel and slot may be transmitted on 1 of the 2 corresponding PSFCH PRBs. Referring to slot i and subchannel j, as shown in FIG. 5, the UE may allocate the [(i+j. $N_{PSSCH}^{PSFCH}$). $M_{subch,slot}^{PSFCH}$, (i+1+j. $N_{PSSCH}^{PSFCH}$). $M_{subch,slot}^{PSFCH}-1$] PRBs from $M_{PRB,set}^{PSFCH}$ PRBs to slot i and sub-channel j, where $0 \leq i \leq N_{PSSCH}^{PSFCH}$ and $0 \leq j \leq N_{subch}$.

As mentioned above, the PSFCH resources 510 may be used to transmit HARQ feedback regarding PSSCHs received in the resource pool 505. Sidelink HARQ may be sequence-based and may carry a single bit per PSSCH. Sidelink HARQ may be sent on two consecutive symbols (e.g., symbols 11 and 12 of a slot). In some cases, one symbol before and one symbol after a PSFCH occasion are assigned to a gap. A parameter (e.g., periodPSFCHresource) may indicate the PSFCH periodicity, in terms of a number of slots, for a resource pool. The PSFCH periodicity can be set to {0,1,2,4}. If the PSFCH periodicity is set to 0, PSFCH transmissions from a UE in the resource pool are disabled. In example 500, the PSFCH periodicity is set to 4, so PSFCH transmissions are performed in every fourth slot.

The UE may transmit the PSFCH in a first slot that includes PSFCH resources and is at least a number of slots, provided by a parameter (e.g., MinTimeGapPSFCH), of the resource pool after a last slot of the PSSCH reception. A parameter (e.g., rbSetPSFCH) may indicate a set and/or a number of $M_{PRB,set}^{PSFCH}$ PRBs in a resource pool for PSFCH transmission. A parameter (e.g., numSubchannel) may indicate a number of $N_{subch}$ subchannels for the resource pool. $N_{PSSCH}^{PSFCH}$ may indicate a number of PSSCH slots associated with a PSFCH slot, which may be determined based at least in part on the parameter periodPSFCHresource described above. In some aspects $M_{PRB,set}^{PSFCH} = \alpha \cdot N_{subch} \cdot N_{PSSCH}^{PSFCH}$ and $$M_{subch,slot}^{PSFCH} = \frac{M_{PRB,set}^{PSFCH}}{N_{subch} \cdot N_{PSSCH}^{PSFCH}}.$$

As indicated above, FIG. 5 is provided as an example. Other examples may differ from what is described with respect to FIG. 5.

A sidelink deployment may support carrier aggregation (CA). In CA, multiple frequency blocks (referred to as component carriers (CCs) or cells) are assigned to a single user. Sidelink CA may improve sidelink throughput relative to a single-carrier configuration. For example, in sidelink CA, a first UE and a second UE may use multiple CCs to communicate with each other. In some examples, sidelink CA may be implemented using a plurality of resource pools. For example, each CC of a sidelink CA configuration may include one or more bandwidth parts (BWPs), and each BWP may include one or more resource pools. In this way, each CC of a sidelink CA configuration may be associated with a respective resource pool or resource pools. The techniques and apparatuses described herein are not limited to those involving respective resource pools for each CC, and can be applied in situations where multiple CCs are configured on a single resource pool, multiple BWPs are configured on a single resource pool, multiple resource pools are configured on a single CC, and/or multiple resource pools are configured on a single BWP, among other examples.

HARQ feedback provides a mechanism for indicating, to a transmitter of a communication, whether the communication was successfully received or not. For example, the transmitter may transmit scheduling information for the communication. A receiver of the scheduling information may monitor resources indicated by the scheduling information in order to receive the communication. If the receiver successfully receives the communication, the receiver may transmit an ACK in HARQ feedback. If the receiver fails to receive the communication, the receiver may transmit a NACK in HARQ feedback. Thus, based at least in part on the HARQ feedback, the transmitter can determine whether the communication should be retransmitted. HARQ feedback is often implemented using a single bit, where a first value of the bit indicates an ACK and a second value of the bit indicates a NACK. Such a bit may be referred to as a HARQ-ACK bit. HARQ-ACK feedback may be conveyed in a HARQ codebook, which may include one or more bits indicating ACKs or NACKs corresponding to one or more communications.

For sidelink CA, HARQ feedback may relate to communications on multiple sidelink CCs. For example, a first UE may transmit HARQ feedback to a second UE regarding multiple PSSCHs on different CCs. As another example, a first UE may transmit HARQ feedback to multiple different UEs regarding PSSCHs received from the multiple different UEs on different CCs. However, if an expected payload size of the HARQ feedback is not aligned between the first UE and the second UE (or the multiple different UEs), then the HARQ feedback cannot be reliably interpreted by the recipient of the HARQ feedback. Failure to properly interpret the HARQ feedback may lead to diminished throughput, unnecessary retransmission, and increased usage of computing and communication resources.

Some techniques and apparatuses described herein provide HARQ feedback for sidelink UEs using a sidelink CA configuration. For example, some techniques and apparatuses described herein provide semi-static sidelink HARQ feedback, in which a UE generates HARQ-ACK bits for the "potential" PSSCH occasions per slot. If the HARQ feedback is to be sent in slot n, the UE may generate HARQ-ACK bits for a set of slots in the past for which a slot offset can point to N. As another example, some techniques and apparatuses described herein provide dynamic sidelink HARQ feedback, in which the UE generates a HARQ codebook based at least in part on a number of SCIs received by the UE and sidelink assignment indicators associated with the number of SCIs. In this way, ambiguity regarding a payload size of the HARQ codebook is eliminated, which enables the reliable usage of HARQ feedback for sidelink CA configurations. In some aspects, the UE may provide the HARQ feedback on a designated CC, such as one or more CCs selected from a CA configuration for the purpose of providing HARQ feedback.

Figure 6:
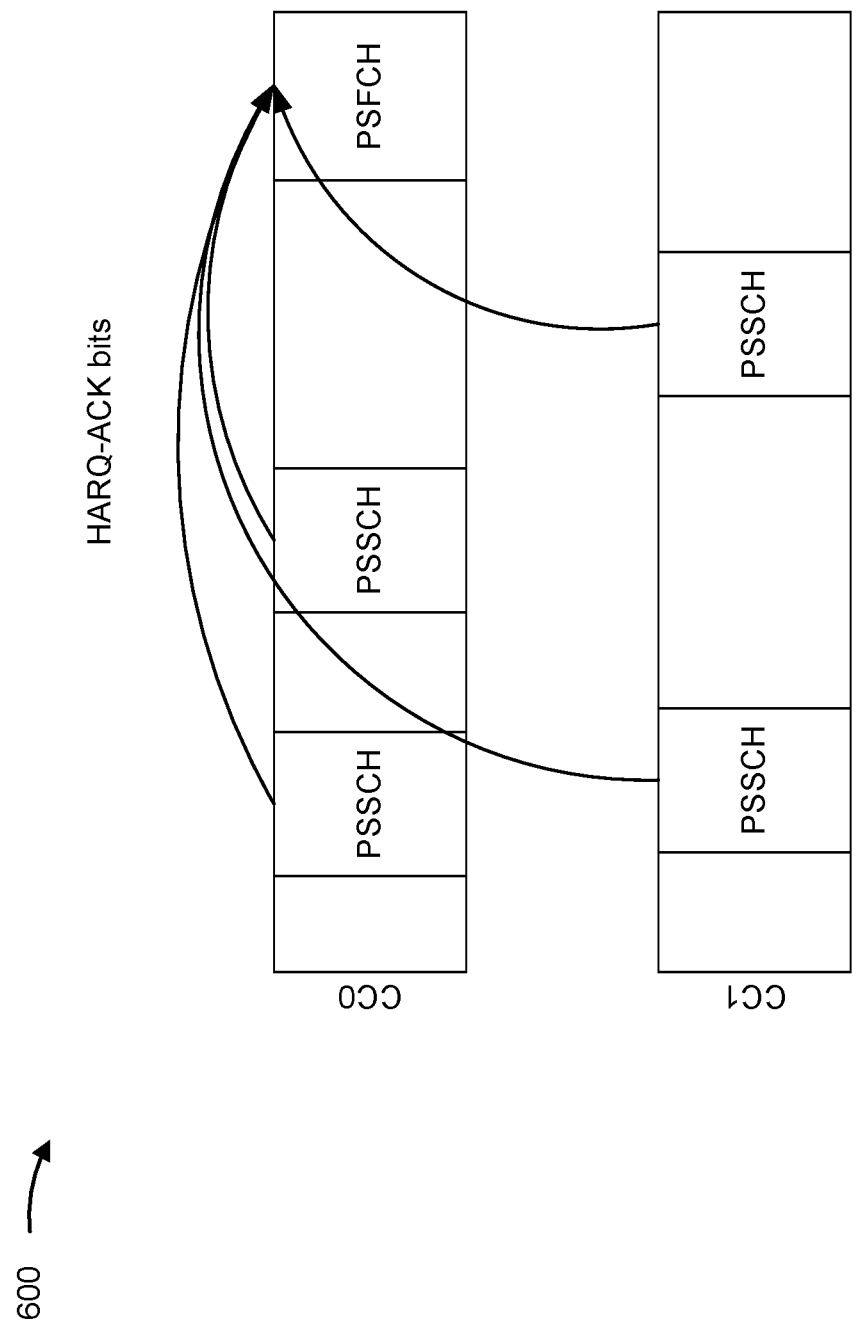
FIG. 6 is a diagram illustrating an example of sidelink feedback for multiple sidelink component carriers, in accordance with various aspects of the present disclosure.

FIG. 6 is a diagram illustrating an example 600 of sidelink feedback for multiple sidelink component carriers, in accordance with various aspects of the present disclosure. Example 600 shows a first CC (CC0) and a second CC (CC1), which are sidelink CCs between a first UE (e.g., a receiver UE) and a second UE (e.g., a transmitter UE). The receiver UE and the transmitter UE are not shown in FIG. 6.

As shown, the first UE may receive, from the second UE, a plurality of PSSCHs. For example, the first UE may receive data or control signaling on one or more PSSCHs on the first CC and one or more PSSCHs on the second CC. As indicated by the arrows from the PSSCHs, the UE may provide HARQ feedback regarding the plurality of PSSCHs on a PSFCH transmitted via a designated set of CCs. In example 500, the designated set of CCs includes only CC0, though other examples may include a different CC (e.g., CC1) or multiple CCs (e.g., CC0 and CC1). The HARQ feedback may include a HARQ codebook. In example 600, the HARQ codebook may include four bits—one corresponding to each of the PSSCHs of example 600. Techniques and apparatuses described herein provide for determination of a semi-static HARQ codebook or a dynamic HARQ codebook based at least in part on the PSSCHs and/or scheduling SCI associated with the PSSCHs.

As indicated above, FIG. 6 is provided as an example. Other examples may differ from what is described with respect to FIG. 6.

While the techniques and apparatuses described herein are generally described with regard to multiple CCs, these techniques can also be applied for a single CC (e.g., a non-CA case). For example, if a single sidelink CC is configured between multiple UEs, the multiple UEs can provide HARQ feedback using a Type 1 codebook or a Type 2 codebook, as described elsewhere herein.

Figure 7:
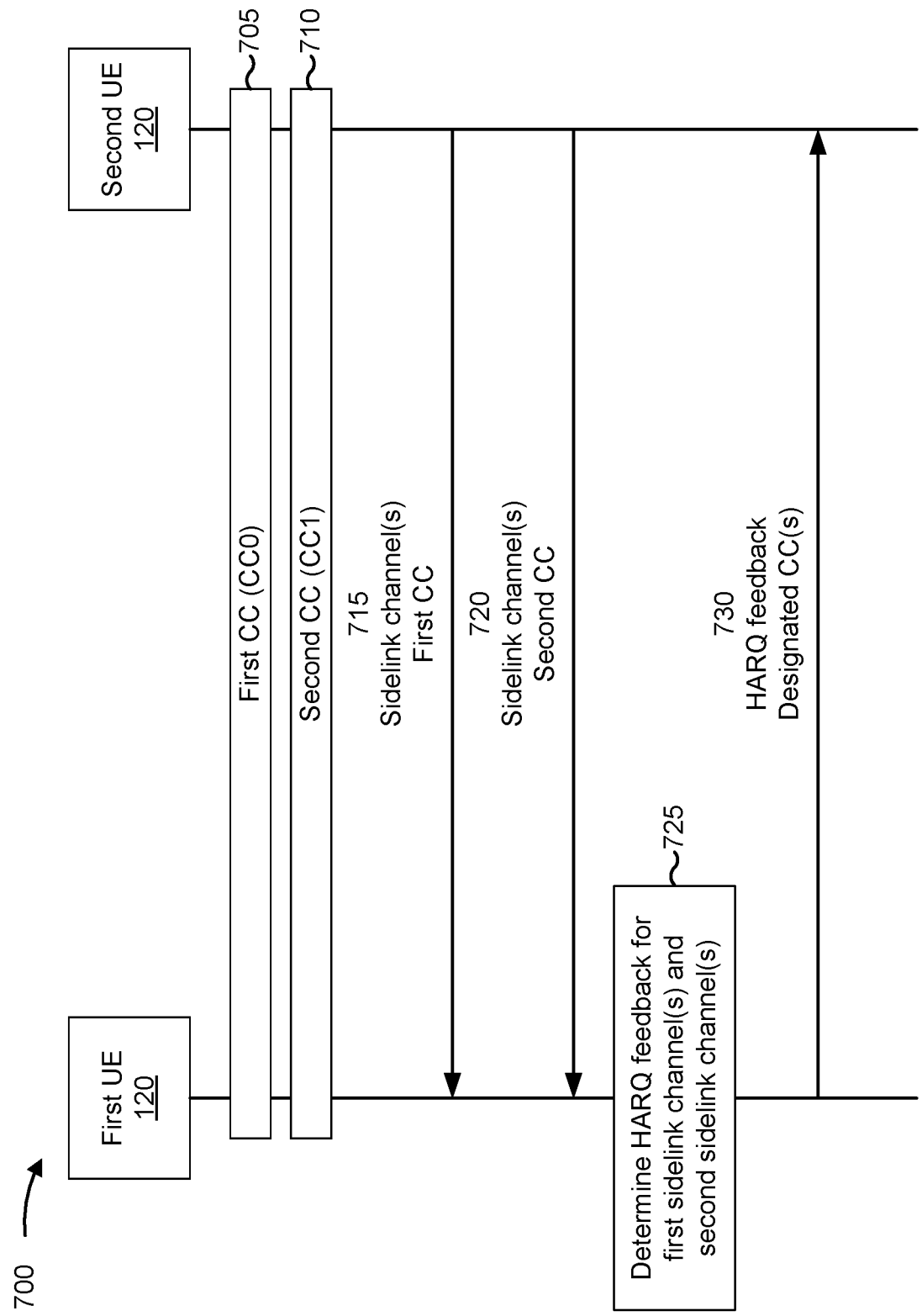
FIG. 7 is a diagram illustrating an example of signaling associated with sidelink feedback for multiple sidelink component carriers, in accordance with various aspects of the present disclosure.

FIG. 7 is a diagram illustrating an example 700 of signaling associated with sidelink feedback for multiple sidelink component carriers, in accordance with various aspects of the present disclosure. As shown, example 700 includes a first UE (e.g., UE 120, UE 305, UE 405/410) and a second UE (e.g., UE 120, UE 305, UE 405/410). In example 700, the first UE is a receiver UE that receives data or control signaling sidelink channels from the second UE. Example 700 is described with regard to a single first UE and a single second UE for clarity. However, there are aspects of the present disclosure that relate to multiple different first UEs and/or multiple different second UEs, and these aspects are described in connection with FIGS. 7-9.

As shown by reference number 705, the first UE and the second UE may be associated with a first CC. As shown by reference number 710, the first UE and the second UE may be associated with a second CC. For example, the first CC and the second CC may be part of a CA configuration of the first UE and the second UE. The first CC and the second CC may be sidelink CCs. A sidelink CC is a CC used for communication between UEs, such as via a sidelink. In some aspects, the first CC and the second CC may be implemented using respective resource pools. In some aspects, the first CC and the second CC may be implemented on a single resource pool. The first UE may be associated with a destination UE identifier, and the second UE may be associated with a source UE identifier. In some aspects, the first CC and the second CC may be associated with a unicast communication. In some aspects, the first CC and the second CC may be associated with a groupcast communication. In some aspects, the first CC and the second CC may be associated with a multicast communication. The "traffic cast type" of a link between the first UE and the second UE may indicate whether the link is associated with a unicast communication, a multicast communication, or a groupcast communication. Furthermore, the first UE and the second UE may be said to be associated with a session. The session may include the first CC and the second CC and may be identified by at least the source UE identifier and the destination UE identifier.

As shown by reference number 715, the first UE may receive, from the second UE, data or control signaling on one or more first sidelink channels on the first CC. As shown by reference number 720, the first UE may receive, from the second UE, data or control signaling on one or more second sidelink channels on the second CC. In some aspects, the one or more first sidelink channels and/or the one or more second sidelink channels may be PSSCHs. In some aspects, the first UE may receive data or control signaling on a sidelink channel on only one of the first CC and the second CC. In some aspects, the first UE may fail to receive data or control signaling on one or more of the sidelink channels shown in example 700.

As shown by reference number 725, the first UE may determine HARQ feedback corresponding to the data or control signaling on the one or more first sidelink channels and the data or control signaling on the one or more second sidelink channels. As shown by reference number 730, the first UE may transmit the HARQ feedback on a designated set of CCs. In example 700, the designated set of CCs includes only the first CC. As mentioned above, the designated set of CCs may additionally or alternatively include the second CC and/or one or more other CCs not shown in FIG. 7.

The HARQ feedback may be transmitted on a PSFCH of a resource pool associated with the designated set of CCs. The PSFCH is described in more detail above. The HARQ feedback may include a HARQ codebook with a group of bits indicating whether each sidelink channel, of the one or more first sidelink channel and the one or more second sidelink channels, was successfully received (e.g., decoded) by the first UE.

In some aspects, the HARQ codebook may be a semi-static HARQ codebook. A semi-static HARQ codebook includes HARQ-ACK bits corresponding to "potential" PSSCH occasions per slot. For example, if a PSFCH is to be transmitted in slot n, the UE may generate HARQ-ACK bits for a set of slots, in the past, for which a slot offset (e.g., K1) can point to slot N. In some aspects, the slot offset may be fixed, and may be set by an RRC parameter MinTimeGapPSFCH. In some aspects, the slot offset (e.g., K1) may be dynamically signaled. It should be understood that "slot offset" and "K1" can refer to a fixed slot offset (e.g., RRC configured, semi-static) or a dynamic slot offset. The slot offset may indicate a number of slots between a PSSCH and a PSFCH that carries HARQ feedback relating to the PSSCH. Since different PSSCHs can be associated with different slot offsets (in some aspects), the PSFCH can carry HARQ feedback for multiple PSSCHs.

Pseudo-code for determining a semi-static HARQ codebook is provided below by way of example only:

Input: set of time-domain resource allocation (TDRA) candidates R

---

```
1>Initialize PSSCH occasion index = j
1> If UE can only receive 1 PSSCH in a slot
   2> Determine 1 PSSCH occasion per slot; add PSSCH occasion j into
set M_{A,c}
1> Else
   2> While R ≠ ∅
      3> Set m to be smallest last orthogonal frequency division
multiplexing (OFDM) symbol index for all TDRA candidates in R
      3> Loop over all TDRA candidates r in R
         4> if candidate starts no later than OFDM symbol m
            5> Put the TDRA candidate into group j
            5> Remove TDRA candidate r from R
         4> End if
      3> End Loop
      3> j = j + 1; add PSSCH occasion j into set M_{A,c}
   2> End while
```

---

In some aspects, in the sidelink, the first UE can receive only a single PSSCH from one other UE in a given slot. Thus, the first part of the pseudocode (e.g., 1> If UE can only receive 1 PSSCH in a slot; 2> Determine 1 PSSCH occasion per slot; add PSSCH occasion j into set $M_{A,c}$) may be used to determine the HARQ codebook.

In some aspects, the slot offset may be fixed (e.g., by radio resource control (RRC) configuration, preconfiguration, or the like). In this case, for each source UE identifier and each traffic cast type, the first UE may generate X HARQ-ACK bits per carrier or resource pool. X may be equal to the number of sidelink slots mapped to a PSFCH occasion. For example, X may be equal to the number of slots that are available for sidelink communication that are associated with a slot offset that indicates that HARQ feedback regarding a PSSCH received in such a slot should be provided in the PSFCH. Not all slots may be available for sidelink communication. For example, uplink slots (e.g., a subset of uplink slots) may be available for sidelink communication, whereas downlink slots may not be available for sidelink communication, depending on the configuration of the first UE and the second UE.

In some aspects, the second UE may indicate the slot offset for a sidelink channel. For example, scheduling information for the sidelink channel (e.g., SCI scheduling the sidelink channel) may indicate the slot offset. In such a case, the first UE may generate K1,max (also referred to herein as Y) HARQ-ACK bits per CC or resource pool. K1,max may be equal to the maximum K1 value of K1 values that can be indicated by the second UE (e.g., the maximum slot offset in the set of PSSCH-to-HARQ values). In this case, the first UE may consider only sidelink slots (e.g., slots available for sidelink communication) when generating the HARQ-ACK bits. For example, the first UE may not generate a HARQ-ACK bit for slots within a window, defined by K1,max, that are unavailable for sidelink communication. In some aspects, the K1 values that can be indicated by the second UE may be configured, such as by RRC signaling or preconfiguration. In some aspects, the K1 values that can be indicated by the second UE may be configured for a particular UE, for a particular traffic cast type, for a particular CC, for a particular resource pool, or the like.

Figure 8:
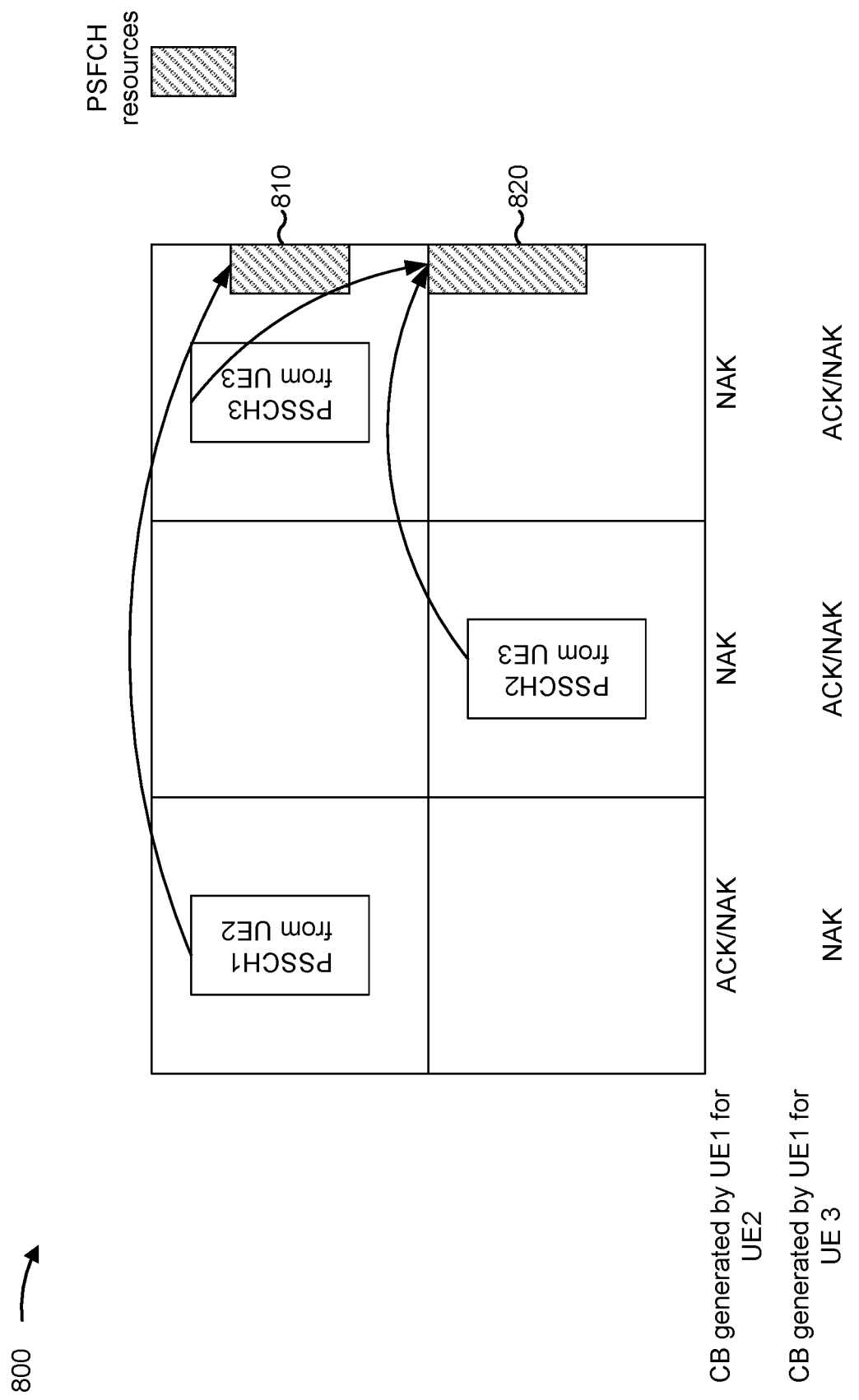
FIG. 8 is a diagram illustrating an example of generating multiple hybrid automatic repeat request acknowledgment (HARQ-ACK) codebooks, in accordance with various aspects of the present disclosure.

In some aspects, the first UE may generate multiple HARQ codebooks. FIG. 8 is a diagram illustrating an example 800 of generating multiple HARQ-ACK codebooks, in accordance with various aspects of the present disclosure. In example 800, a designated CC is shown, and a UE1 (e.g., UE 120, UE 305, UE 405/410) receives PSSCHs from a UE2 and a UE3 (e.g., UE 120, UE 305, UE 405/410) on the designated CC. The UE1 may receive data or control signaling on one PSSCH from one UE per slot (where the vertical lines delineate slots), as mentioned above. For example, the UE1 receives data or control signaling on a PSSCH1 from the UE2, and data or control signaling on a PSSCH2 and a PSSCH3 from the UE3, in respective slots. As indicated by the arrow from PSSCH1 to a first PSFCH resource 810, the UE1 may generate and transmit a first HARQ codebook to the UE2. As indicated by the arrows from PSSCH2 and PSSCH3 to a second PSFCH resource 820, the UE1 may generate and transmit a second HARQ codebook to the UE3. In some aspects, the UE1 may generate a respective HARQ codebook per unicast link and per groupcast link (e.g., a respective HARQ codebook per session). For example, the UE1 may generate and transmit a respective HARQ codebook per UE source identifier. As shown in example 800, a UE1 may have a unicast link with a UE2 and a UE3. In case the transmissions are HARQ-based, the UE1 may generate one codebook based at least in part on data or control signaling on PSSCHs received from UE2 and one in response to data or control signaling on PSSCHs received from UE3.

As shown, the HARQ codebook transmitted to UE2 may indicate an ACK/NACK for the PSSCH1 and may indicate NACKs for the PSSCH2 and the PSSCH3. The HARQ codebook transmitted to UE3 may indicate a NACK for the PSSCH1 and may indicate ACK/NACKs for the PSSCH2 and the PSSCH3. The window size for the HARQ codebooks may be selected based at least in part on a K1,max value, as mentioned above, which may be equal to the maximum K1 value of K1 values selectable by UE2 and UE3. Here, K1,max is 2, since the longest slot offset shown in FIG. 8 is 2 (i.e., the PSFCH for PSSCH1 is transmitted two slots after an end of a slot in which PSSCH1 is received). Thus, both HARQ codebooks are generated based at least in part on the value of K1,max of 2.

Returning to FIG. 7, in some aspects, the HARQ codebook may be a dynamic HARQ codebook. A dynamic HARQ codebook is a HARQ codebook that is determined based at least in part on PSCCH monitoring occasions and/or SAIs. A PSCCH monitoring occasion is a set of resources that a UE may monitor for a PSSCH. A PSSCH monitoring occasion may be determined based at least in part on slot offsets between a PSSCH and a corresponding PSFCH (e.g., K1) and slot offsets between a PSCCH and a corresponding PSSCH (e.g., K0). A PSSCH monitoring occasion is counted only in the time domain, meaning that a PSSCH monitoring occasion can span multiple CCs (if PSSCH monitoring resources on the multiple CCs are aligned with each other in time). An SAI may be conveyed via SCI. An SAI may include a counter SAI (sometimes abbreviated cSAI) and a total SAI (sometimes abbreviated tSAI). Generally, the cSAI and the tSAI can be used to determine how many SCIS (and thus how many scheduled PSSCHs) were transmitted to the first UE. The first UE may use the SAIs conveyed via SCIs from the second UE to determine how many HARQ-ACK bits should be included in a PSFCH.

Figure 9:
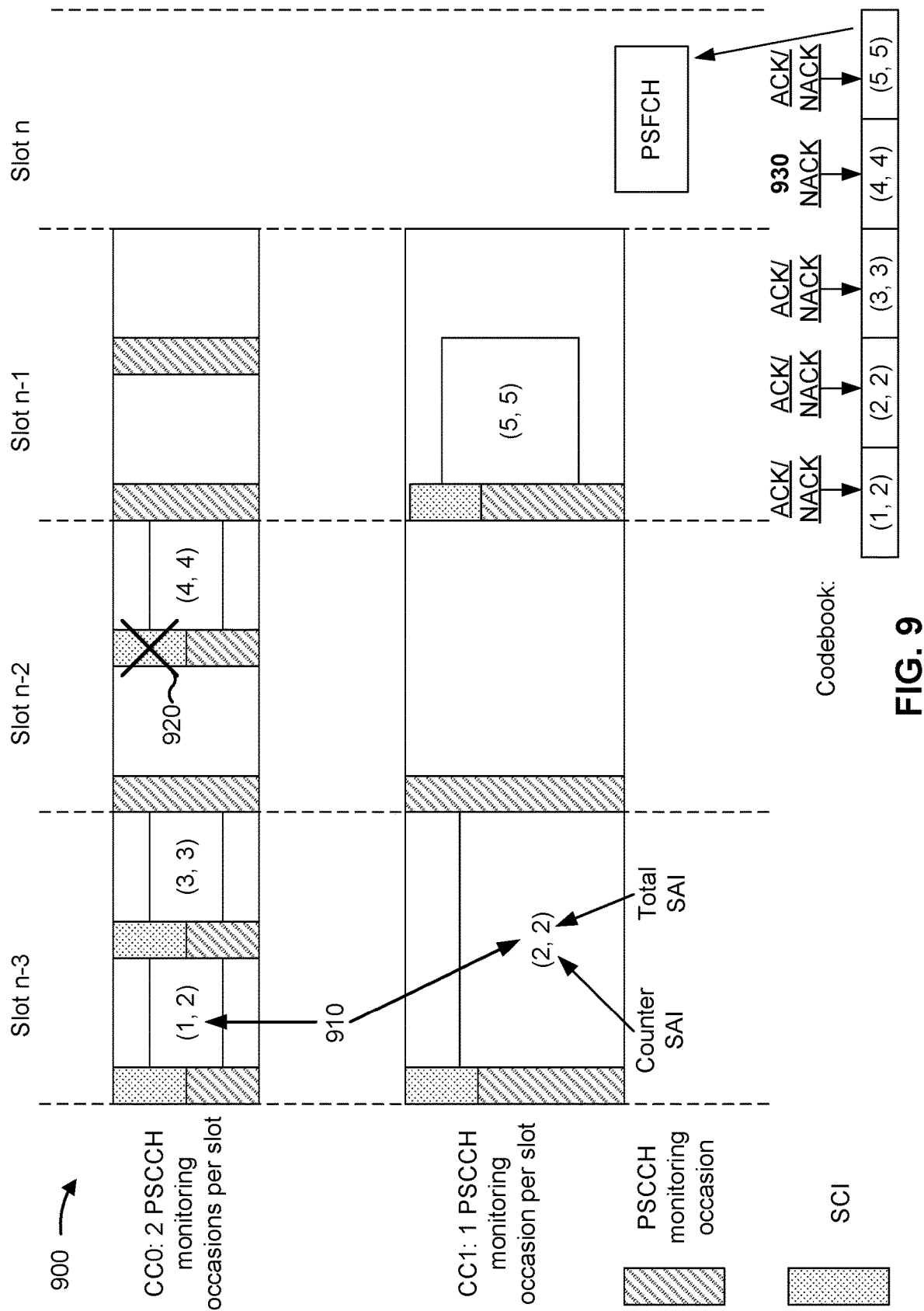
FIG. 9 is a diagram illustrating an example of determination of a HARQ codebook using sidelink assignment indicators, in accordance with various aspects of the present disclosure.

FIG. 9 is a diagram illustrating an example 900 of determination of a HARQ codebook using SAIs, in accordance with various aspects of the present disclosure. As shown, example 900 includes a CC0 and a CC1. In CC0, there are two PSCCH monitoring occasions per slot. In CC1, there is one PSCCH monitoring occasion per slot. An SCI received on a particular PSCCH monitoring occasion is shown with dotted hatching occupying part of the particular PSCCH monitoring occasion. Furthermore, various pairs of cSAI values and tSAI values are shown using the notation (cSAI, tSAI). These pairs of cSAI values and tSAI values may be received in the SCI and are shown at the corresponding location of the PSFCH.

As shown by reference number 910, a first cSAI/SAI pair and a second cSAI/tSAI pair may be associated with the same tSAI value of 2 and respective cSAI values of 1 and 2. This may be because, as of the first PSCCH monitoring occasion, two total SCI are cumulatively transmitted by the second UE. Furthermore, the SCI transmitted on CC0 may be counted before the SCI transmitted on CC1. This may be due to a counting order assigned to CC0 and CC1 for the purposes of determining cSAI and tSAI values. For example, the order may be based at least in part on a control resource set identifier, a search space identifier, a CC differentiation value in the SCI, or further examples. The cSAI may be based at least in part on a cumulative number of instances in which SCI has been transmitted by a given source UE up to a current PSCCH monitoring occasion, CC, and source UE instance. The tSAI may be based at least in part on a total number of instances in which SCI has been transmitted by a source UE up to the current PSCCH monitoring occasion.

As further shown, the first UE may successfully receive a first, second, and third SCI. The first UE may add an ACK or NACK value to a location in the codebook based at least in part on a result of decoding a PSSCH associated with an SCI corresponding to the location. For example, the first UE may add an ACK when the PSSCH is successfully decoded and may add a NACK when the PSSCH is not successfully decoded.

As shown by reference number 920, the first UE may fail to receive a fourth SCI, shown by the X over the fourth SCI. For example, the first UE may determine that the first UE has failed to receive the fourth SCI based at least in part on receiving the fifth SCI. The first UE may determine that the first UE received SCI with a cSAI value of 3 and a cSAI value of 5 and did not receive SCI with a cSAI value of 4, thus indicating that the fourth SCI was missed.

Accordingly, and as shown by reference number 930, the first UE may add a NACK to the codebook shown at the bottom right of FIG. 9, in a location consistent with the SCI. This may indicate that the PSSCH corresponding to the fourth SCI was not received, since the first UE does not know the location of the PSSCH corresponding to the fourth SCI. As further shown, the first UE may transmit a PSFCH based at least in part on the codebook.

In some aspects, the second UE may include a cSAI and a tSAI in each SCI (e.g., in SCI-2). For example, the cSAI and the tSAI may be indicated by a gNB (e.g., if the second UE acts as a relay UE between the gNB and the first UE) directly or indirectly. As another example, the cSAI and the tSAI may be determined by the second UE. The second UE may track a cSAI/tSAI counter (e.g., a set of (V_c,V_t)) for each destination UE identifier (e.g., for each session of the second UE). For example, a second UE might have a unicast communication with one first UE and groupcast communication with multiple other first UEs. In such a case, the second UE increments counters separately and independently for the unicast communication and for the groupcast communication. In other words, a groupcast communication may be associated with a single source UE identifier and a single destination UE identifier, where the source UE identifier corresponds to a single UE and the destination UE identifier corresponds to multiple UEs. The second UE may follow the received counter SAI and total SAI from each second UE to generate a HARQ codebook. For example, the second UE may keep track of one set of (V_c, V_t) for each source UE identifier (e.g., for each sidelink session that a first UE has).

Returning to FIG. 7, as shown by reference number 730, the first UE may transmit the HARQ feedback. For example, the first UE may transmit the HARQ feedback on a designated set of CCs (e.g., CC0) via a PSFCH configured for a resource pool associated with the designated set of CCs. Thus, the first UE may generate a HARQ codebook based at least in part on a semi-static technique or a dynamic technique and may transmit the HARQ codebook to a corresponding second UE. The second UE may interpret the HARQ codebook (e.g., based at least in part on whether the HARQ codebook is based at least in part on a dynamic technique or a semi-static technique), and may selectively retransmit a communication, change a communication configuration, or the like, based at least in part on the HARQ codebook. In this way, ambiguity regarding a payload size of the HARQ codebook is eliminated, which enables the reliable usage of HARQ feedback for sidelink CA configurations.

In some aspects, the first UE and/or the second UE may select the codebook type (e.g., a semi-static technique or a dynamic technique) based at least in part on one or more factors, such as a cast type, a zone identifier, a configuration for a resource pool or BWP or CC, a configuration dependent on the band or band combination of sidelink operation, based at least in part on a negotiation or decision process between the first UE and the second UE, or based at least in part on an indication by a gNB.

As indicated above, FIGS. 7-9 are provided as one or more examples. Other examples may differ from what is described with respect to FIGS. 7-9.

Figure 10:
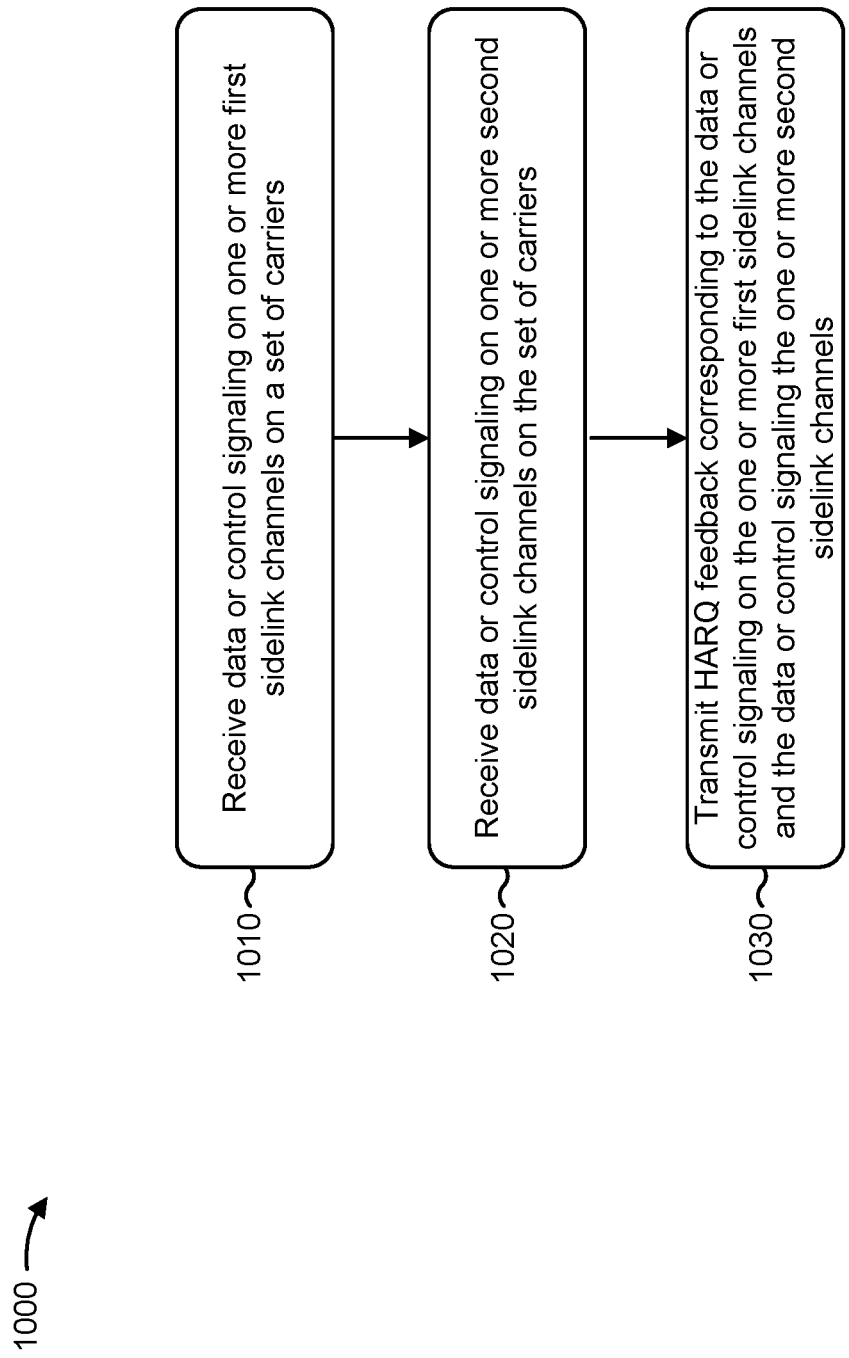
FIGS. 10-11 are diagrams illustrating example processes associated with HARQ feedback for a sidelink, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120, UE 305, UE 405/410) performs operations associated with HARQ feedback for a sidelink.

As shown in FIG. 10, in some aspects, process 1000 may include receiving data or control signaling on one or more first sidelink channels on a first sidelink CC (block 1010). For example, the UE (e.g., using reception component 1202, depicted in FIG. 12) may receive data or control signaling on one or more first sidelink channels on a first sidelink CC, as described above.

As further shown in FIG. 10, in some aspects, process 1000 may include receiving data or control signaling on one or more second sidelink channels on the set of sidelink carriers (block 1020). For example, the UE (e.g., using reception component 1202, depicted in FIG. 12) may receive data or control signaling on one or more second sidelink channels on the set of sidelink carriers, as described above. It should be noted that, in some aspects, the UE may receive data or control signaling on zero or more first sidelink channels on the first sidelink CC and/or zero or more second sidelink channels on the second sidelink CC.

As further shown in FIG. 10, in some aspects, process 1000 may include transmitting HARQ feedback corresponding to the data or control signaling on the one or more first sidelink channels and the data or control signaling on the one or more second sidelink channels (block 1030). For example, the UE (e.g., using transmission component 1204, depicted in FIG. 12) may transmit HARQ feedback corresponding to the data or control signaling on the one or more first sidelink channels and the data or control signaling on the one or more second sidelink channels, as described above.

Process 1000 may include additional aspects, such as any single aspect or any combination of aspects described below and/or in connection with one or more other processes described elsewhere herein.

In a first aspect, the HARQ feedback is based at least in part on a semi-static HARQ codebook.

In a second aspect, alone or in combination with the first aspect, the HARQ feedback is associated with a fixed slot offset.

In a third aspect, alone or in combination with one or more of the first and second aspects, the HARQ feedback is associated with one or more UE identifiers, one or more traffic cast types, and one or more resource pools, and wherein the HARQ feedback includes, for each source UE identifier and traffic cast type, X bits per carrier or per resource pool, where X is equal to a number of sidelink slots mapped to a feedback channel occasion in which the HARQ feedback is transmitted.

In a fourth aspect, alone or in combination with one or more of the first through third aspects, the HARQ feedback is associated with a transmitter UE, wherein one or more slot offsets associated with the one or more first sidelink channels or the one or more second sidelink channels are set by the transmitter UE, and wherein the HARQ feedback includes, per carrier or per resource pool, N*Y bits, where Y is a maximum slot offset of the one or more slot offsets.

In a fifth aspect, alone or in combination with one or more of the first through fourth aspects, Y is based at least in part on a number of sidelink slots that are available for sidelink communication.

In a sixth aspect, alone or in combination with one or more of the first through fifth aspects, the one or more slot offsets are configured for the UE or the transmitter UE.

In a seventh aspect, alone or in combination with one or more of the first through sixth aspects, the HARQ feedback includes one HARQ codebook per unicast link and one HARQ codebook per groupcast link of the UE.

In an eighth aspect, alone or in combination with one or more of the first through seventh aspects, the HARQ feedback is based at least in part on a dynamic HARQ codebook.

In a ninth aspect, alone or in combination with one or more of the first through eighth aspects, the HARQ feedback is based at least in part on SAIs included in transmissions on the one or more first sidelink channels and the data or control signaling on the one or more second sidelink channels.

In a tenth aspect, alone or in combination with one or more of the first through ninth aspects, the SAIs are received via sidelink control information.

In an eleventh aspect, alone or in combination with one or more of the first through tenth aspects, the SAIs are tracked based at least in part on a source identifier associated with the SAIs.

In an twelfth aspect, alone or in combination with one or more of the first through eleventh aspects, the set of sidelink carriers includes a first sidelink component carrier (CC) associated with the one or more first sidelink channels and a second sidelink CC associated with the one or more second sidelink channels.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
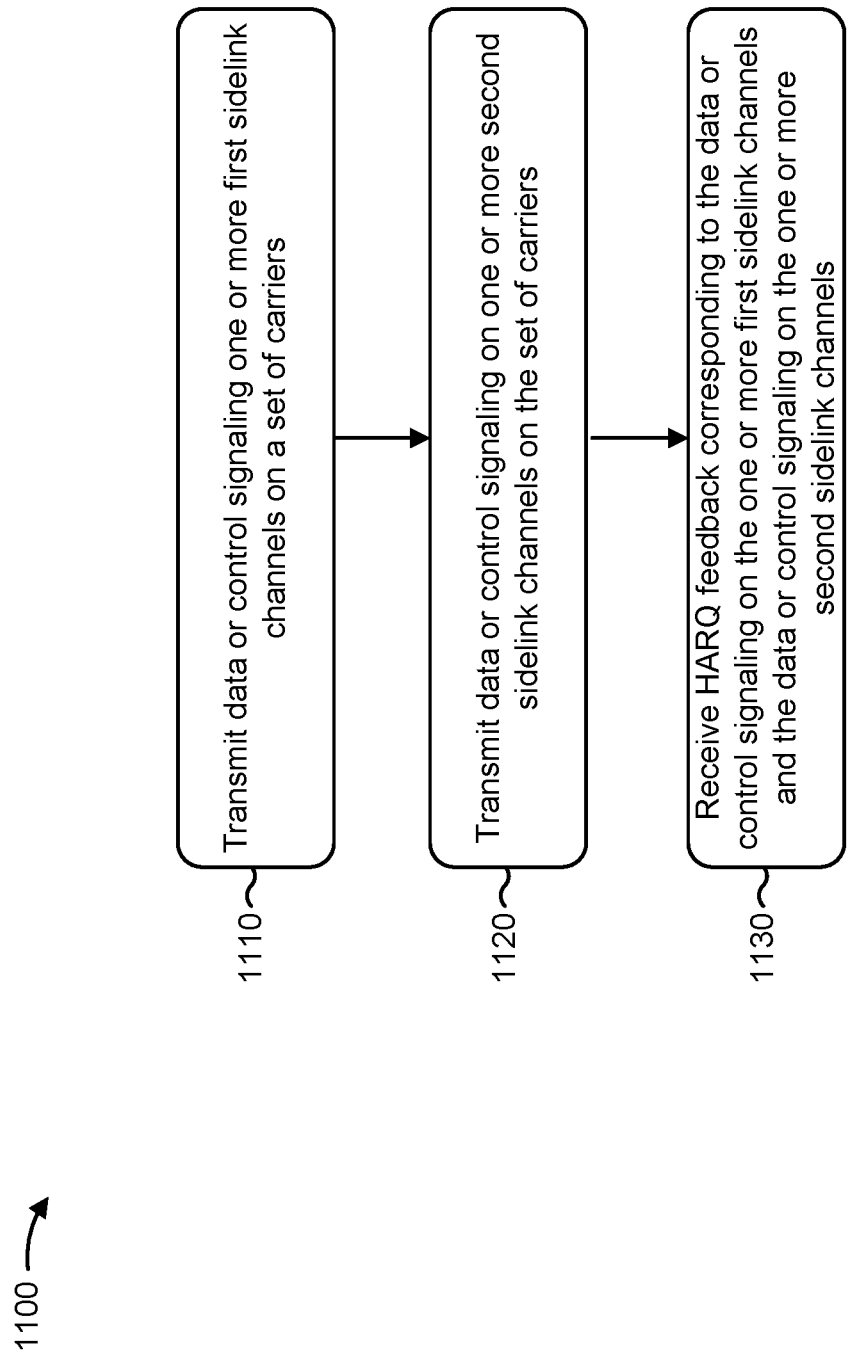

FIG. 11 is a diagram illustrating an example process 1100 performed, for example, by a first user equipment (UE), in accordance with various aspects of the present disclosure. Example process 1100 is an example where the UE (e.g., UE 120) performs operations associated with HARQ feedback for a sidelink.

As shown in FIG. 11, in some aspects, process 1100 may include transmitting, to a second UE, data or control signaling on one or more first sidelink channels on a first sidelink CC (block 1110). For example, the UE (e.g., using transmission component 1304, depicted in FIG. 13) may transmit, to a second UE, data or control signaling on one or more first sidelink channels on a first sidelink CC, as described above.

As further shown in FIG. 11, in some aspects, process 1100 may include transmitting, to the second UE, data or control signaling on one or more second sidelink channels on the set of sidelink carriers (block 1120). For example, the UE (e.g., using transmission component 1304, depicted in FIG. 13) may transmit, to the second UE, data or control signaling on one or more second sidelink channels on the set of sidelink carriers, as described above.

As further shown in FIG. 11, in some aspects, process 1100 may include receiving, from the second UE, HARQ feedback corresponding to the data or control signaling on the one or more first sidelink channels and the data or control signaling on the one or more second sidelink channels (block 1130). For example, the UE (e.g., using reception component 1302, depicted in FIG. 13) may receive, from the second UE, HARQ feedback corresponding to the data or control signaling on the one or more first sidelink channels and the data or control signaling on the one or more second sidelink channels, as described above.

Process 1100 may include additional aspects, such as any single aspect or any combination of aspects described below and/or in connection with one or more other processes described elsewhere herein.

In a first aspect, the HARQ feedback is based at least in part on a semi-static HARQ codebook.

In a second aspect, alone or in combination with the first aspect, the HARQ feedback is associated with a fixed slot offset.

In a third aspect, alone or in combination with one or more of the first and second aspects, the HARQ feedback is associated with one or more UE identifiers, one or more traffic cast types, and one or more resource pools, and wherein the HARQ feedback includes, for each source UE identifier and traffic cast type, X bits per carrier or per resource pool, where X is equal to a number of sidelink slots mapped to a feedback channel occasion in which the HARQ feedback is transmitted.

In a fourth aspect, alone or in combination with one or more of the first through third aspects, process 1100 includes setting one or more slot offsets associated with the one or more first sidelink channels or the one or more second sidelink channels, wherein the HARQ feedback includes, per carrier or per resource pool, N*Y bits, where Y is a maximum slot offset of the one or more slot offsets.

In a fifth aspect, alone or in combination with one or more of the first through fourth aspects, Y is based at least in part on a number of sidelink slots that are available for sidelink communication.

In a sixth aspect, alone or in combination with one or more of the first through fifth aspects, the one or more slot offsets are configured for the first UE or the second UE.

In a seventh aspect, alone or in combination with one or more of the first through sixth aspects, the HARQ feedback includes one HARQ codebook per unicast link and one HARQ codebook per groupcast link of the second UE.

In an eighth aspect, alone or in combination with one or more of the first through seventh aspects, the HARQ feedback is based at least in part on a dynamic HARQ codebook.

In a ninth aspect, alone or in combination with one or more of the first through eighth aspects, the HARQ feedback is based at least in part on SAIs included in transmissions on the one or more first sidelink channels and the data or control signaling on the one or more second sidelink channels.

In a tenth aspect, alone or in combination with one or more of the first through ninth aspects, process 1100 includes transmitting the SAIs via sidelink control information.

In an eleventh aspect, alone or in combination with one or more of the first through tenth aspects, the respective SAIs are tracked based at least in part on one or more destination identifiers associated with the respective SAIs.

In an twelfth aspect, alone or in combination with one or more of the first through eleventh aspects, the set of sidelink carriers includes a first sidelink component carrier (CC) associated with the one or more first sidelink channels and a second sidelink CC associated with the one or more second sidelink channels.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
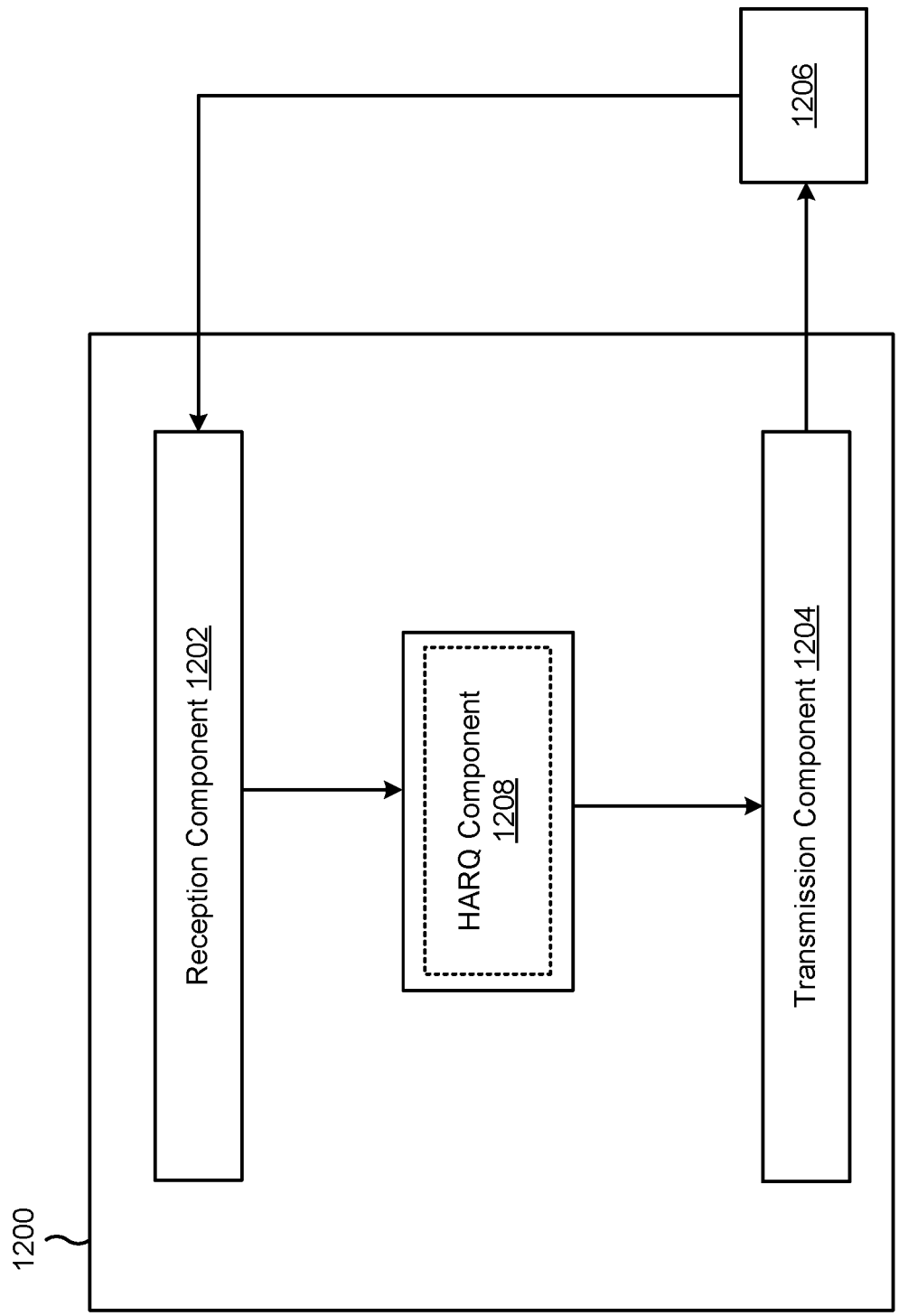
FIGS. 12-13 are block diagrams of example apparatuses for wireless communication, in accordance with various aspects of the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a HARQ component 1208 among other examples.

In some aspects, the apparatus 1200 may be configured to perform one or more operations described herein in connection with FIGS. 3-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The reception component 1202 may receive data or control signaling on one or more first sidelink channels on a first sidelink CC. The reception component 1202 may receive data or control signaling on one or more second sidelink channels on the set of sidelink carriers. The transmission component 1204 may transmit HARQ feedback corresponding to the data or control signaling on the one or more first sidelink channels and the data or control signaling on the one or more second sidelink channels. The HARQ component 1208 may generate the HARQ feedback.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
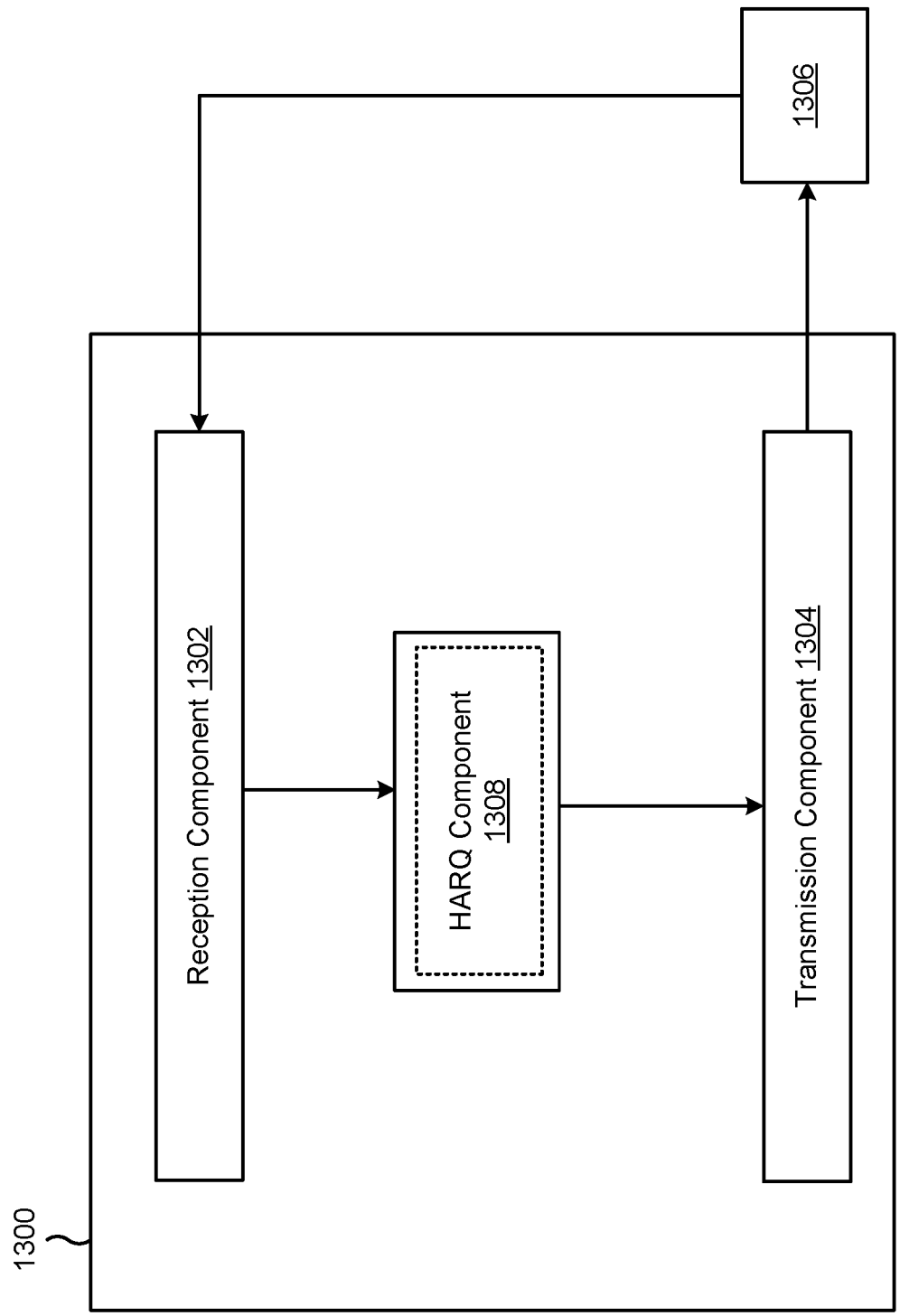

FIG. 13 is a block diagram of an example apparatus 1300 for wireless communication. The apparatus 1300 may be a first UE, or a first UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a HARQ component 1308, among other examples.

In some aspects, the apparatus 1300 may be configured to perform one or more operations described herein in connection with FIGS. 3-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the first UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the first UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the first UE described above in connection with FIG. 2. In some aspects, the transmission component 1304 may be co-located with the reception component 1302 in a transceiver.

The transmission component 1304 may transmit, to a second UE, data or control signaling on one or more first sidelink channels on a first sidelink CC. The transmission component 1304 may transmit, to the second UE, data or control signaling on one or more second sidelink channels on the set of sidelink carriers. The reception component 1302 may receive, from the second UE, HARQ feedback corresponding to the data or control signaling on the one or more first sidelink channels and the data or control signaling on the one or more second sidelink channels. The HARQ component 1308 may interpret the HARQ feedback. The HARQ component 1308 may set one or more slot offsets associated with the one or more first sidelink channels or the one or more second sidelink channels, wherein the HARQ feedback includes, per carrier or per resource pool, $N*Y$ bits, where Y is a maximum slot offset of the one or more slot offsets. The transmission component 1304 may transmit the SAIs via sidelink control information. The HARQ component 1308 may determine the SAIs.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of aspects of the present disclosure:

Aspect 1: A method of wireless communication performed by a user equipment (UE), comprising: receiving data or control signaling on one or more first sidelink channels on a set of sidelink carriers; receiving data or control signaling on one or more second sidelink channels on the set of sidelink carriers; and transmitting hybrid automatic repeat request (HARQ) feedback corresponding to the data or control signaling on the one or more first sidelink channels and the data or control signaling on the one or more second sidelink channels.

Aspect 2: The method of aspect 1, wherein the HARQ feedback is based at least in part on a semi-static HARQ codebook.

Aspect 3: The method of any of aspects 1-2, wherein the HARQ feedback is associated with a fixed slot offset.

Aspect 4: The method of aspect 3, wherein the HARQ feedback is associated with one or more UE identifiers, one or more traffic cast types, and one or more resource pools, and wherein the HARQ feedback includes, for each source UE identifier and traffic cast type, X bits per carrier or per resource pool, where X is equal to a number of sidelink slots mapped to a feedback channel occasion in which the HARQ feedback is transmitted.

Aspect 5: The method of any of aspects 1-4, wherein the HARQ feedback is associated with a transmitter UE, wherein one or more slot offsets associated with the one or more first sidelink channels or the one or more second sidelink channels are set by the transmitter UE, and wherein the HARQ feedback includes, per carrier or per resource pool, $N*Y$ bits, where Y is a maximum slot offset of the one or more slot offsets.

Aspect 6: The method of aspect 5, wherein Y is based at least in part on a number of sidelink slots that are available for sidelink communication.

Aspect 7: The method of aspect 5, wherein the one or more slot offsets are configured for the UE or the transmitter UE.

Aspect 8: The method of any of aspects 1-7, wherein the HARQ feedback includes one HARQ codebook per unicast link and one HARQ codebook per groupcast link of the UE.

Aspect 9: The method of aspect 1, wherein the HARQ feedback is based at least in part on a dynamic HARQ codebook.

Aspect 10: The method of one or more aspects such as aspect 9, wherein the HARQ feedback is based at least in part on sidelink assignment indicators (SAIs) included in transmissions on the one or more first sidelink channels and the data or control signaling on the one or more second sidelink channels.

Aspect 11: The method of any of aspects 9-10, wherein the SAIs are received via sidelink control information.

Aspect 12: The method of aspect 10, wherein the SAIs are tracked based at least in part on a source identifier associated with the SAIs.

Aspect 13: A method of wireless communication performed by a first user equipment (UE), comprising: transmitting, to a second UE, data or control signaling on one or more first sidelink channels on a set of sidelink carriers; transmitting, to the second UE, data or control signaling on one or more second sidelink channels on the set of sidelink carriers; and receiving, from the second UE, hybrid automatic repeat request (HARQ) feedback corresponding to the data or control signaling on the one or more first sidelink channels and the data or control signaling on the one or more second sidelink channels.

Aspect 14: The method of aspect 13, wherein the HARQ feedback is based at least in part on a semi-static HARQ codebook.

Aspect 15: The method of any of aspects 13-14, wherein the HARQ feedback is associated with a fixed slot offset.

Aspect 16: The method of aspect 15, wherein the HARQ feedback is associated with one or more UE identifiers, one or more traffic cast types, and one or more resource pools, and wherein the HARQ feedback includes, for each source UE identifier and traffic cast type, X bits per carrier or per resource pool, where X is equal to a number of sidelink slots mapped to a feedback channel occasion in which the HARQ feedback is transmitted.

Aspect 17: The method of any of aspects 13-16, further comprising: setting one or more slot offsets associated with the one or more first sidelink channels or the one or more second sidelink channels, wherein the HARQ feedback includes, per carrier or per resource pool, $N*Y$ bits, where Y is a maximum slot offset of the one or more slot offsets.

Aspect 18: The method of aspect 17, wherein Y is based at least in part on a number of sidelink slots that are available for sidelink communication.

Aspect 19: The method of aspect 17, wherein the one or more slot offsets are configured for the first UE or the second UE.

Aspect 20: The method of any of aspects 13-19, wherein the HARQ feedback includes one HARQ codebook per unicast link and one HARQ codebook per groupcast link of the second UE.

Aspect 21: The method of aspect 13, wherein the HARQ feedback is based at least in part on a dynamic HARQ codebook.

Aspect 22: The method of aspect 13, wherein the HARQ feedback is based at least in part on sidelink assignment indicators (SAIs) included in transmissions on the one or more first sidelink channels and the one or more second sidelink channels.

Aspect 23: The method of aspect 22, further comprising: transmitting the SAIs via sidelink control information.

Aspect 24: The method of aspect 22, wherein the respective SAIs are tracked based at least in part on one or more destination identifiers associated with the respective SAIs.

Aspect 25: An apparatus for wireless communication at a device, comprising a processor; memory coupled with the processor; and instructions stored in the memory and executable by the processor to cause the apparatus to perform the method of one or more aspects of aspects 1-24.

Aspect 26: A device for wireless communication, comprising a memory and one or more processors coupled to the memory, the memory and the one or more processors configured to perform the method of one or more aspects of aspects 1-24.

Aspect 27: An apparatus for wireless communication, comprising at least one means for performing the method of one or more aspects of aspects 1-24.

Aspect 28: A non-transitory computer-readable medium storing code for wireless communication, the code comprising instructions executable by a processor to perform the method of one or more aspects of aspects 1-24.

Aspect 29: A non-transitory computer-readable medium storing a set of instructions for wireless communication, the set of instructions comprising one or more instructions that, when executed by one or more processors of a device, cause the device to perform the method of one or more aspects of aspects 1-24.

Aspect 30: The method of any of aspects 1-24, wherein the set of sidelink carriers includes a first sidelink component carrier (CC) associated with the one or more first sidelink channels and a second sidelink CC associated with the one or more second sidelink channels.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive data or control signaling on one or more first sidelink channels on a first component carrier of a set of carriers;
      receive data or control signaling on one or more second sidelink channels on a second component carrier of the set of carriers; and
      transmit, on a designated set of component carriers, hybrid automatic repeat request (HARQ) feedback corresponding to the data or control signaling on the one or more first sidelink channels and the data or control signaling on the one or more second sidelink channels, the designated set of component carriers including:
   only the first component carrier, or
   the second component carrier and one or more other component carriers.

2. The UE of claim 1, wherein the HARQ feedback is based at least in part on a semi-static HARQ codebook.

3. The UE of claim 1, wherein the HARQ feedback is associated with a fixed slot offset.

4. The UE of claim 3, wherein the HARQ feedback is associated with one or more UE identifiers, one or more traffic cast types, and one or more resource pools, and wherein the HARQ feedback includes, for each source UE identifier and traffic cast type, X bits per carrier or per resource pool, where X is equal to a number of sidelink slots mapped to a feedback channel occasion in which the HARQ feedback is transmitted.

5. The UE of claim 1, wherein the HARQ feedback is associated with a transmitter UE, wherein one or more slot offsets associated with the one or more first sidelink channels or the one or more second sidelink channels are set by the transmitter UE, and wherein the HARQ feedback includes, per carrier or per resource pool, N*Y bits, where Y is a maximum slot offset of the one or more slot offsets and N is an integer.

6. The UE of claim 5, wherein Y is based at least in part on a number of sidelink slots that are available for sidelink communication.

7. The UE of claim 5, wherein the one or more slot offsets are configured for the UE or the transmitter UE.

8. The UE of claim 1, wherein the HARQ feedback includes one HARQ codebook per unicast link and one HARQ codebook per groupcast link of the UE.

9. The UE of claim 1, wherein the HARQ feedback is based at least in part on a dynamic HARQ codebook.

10. The UE of claim 1, wherein the HARQ feedback is based at least in part on sidelink assignment indicators (SAIs) included in transmissions on the one or more first sidelink channels and the one or more second sidelink channels.

11. The UE of claim 10, wherein the SAIs are received via sidelink control information.

12. The UE of claim 10, wherein the SAIs are tracked based at least in part on a source identifier associated with the SAIs.

13. A first user equipment (UE) for wireless communication, comprising:
   a memory; and
   one or more processors, coupled to the memory, configured to:
      transmit, to a second UE, data or control signaling on one or more first sidelink channels on a first component carrier of a set of sidelink carriers;
      transmit, to the second UE, data or control signaling on one or more second sidelink channels on a second component carrier of the set of sidelink carriers; and
      receive, from the second UE and on a designated set of component carriers, hybrid automatic repeat request (HARQ) feedback corresponding to the data or control signaling on the one or more first sidelink channels and the data or control signaling on the one or more second sidelink channels,
      the designated set of component carriers including:
         only the first component carrier, or
         the second component carrier and one or more other component carriers.

14. The first UE of claim 13, wherein the HARQ feedback is based at least in part on a semi-static HARQ codebook.

15. The first UE of claim 13, wherein the HARQ feedback is associated with a fixed slot offset.

16. The first UE of claim 15, wherein the HARQ feedback is associated with one or more UE identifiers, one or more traffic cast types, and one or more resource pools, and wherein the HARQ feedback includes, for each source UE identifier and traffic cast type, X bits per carrier or per resource pool, where X is equal to a number of sidelink slots mapped to a feedback channel occasion in which the HARQ feedback is transmitted.

17. The first UE of claim 13, wherein the one or more processors are further configured to:
   set one or more slot offsets associated with the one or more first sidelink channels or the one or more second sidelink channels, wherein the HARQ feedback includes, per carrier or per resource pool, N*Y bits, where Y is a maximum slot offset of the one or more slot offsets and N is an integer.

18. The first UE of claim 17, wherein Y is based at least in part on a number of sidelink slots that are available for sidelink communication.

19. The first UE of claim 17, wherein the one or more slot offsets are configured for the first UE or the second UE.

20. The first UE of claim 13, wherein the HARQ feedback includes one HARQ codebook per unicast link and one HARQ codebook per groupcast link of the second UE.

21. The first UE of claim 13, wherein the HARQ feedback is based at least in part on a dynamic HARQ codebook.

22. The first UE of claim 13, wherein the HARQ feedback is based at least in part on sidelink assignment indicators (SAIs) included in transmissions on the one or more first sidelink channels and the one or more second sidelink channels.

23. The first UE of claim 22, wherein the one or more processors are further configured to:
   transmit the SAIs via sidelink control information.

24. The first UE of claim 22, wherein the SAIs are tracked based at least in part on one or more destination identifiers associated with the SAIs.

25. A method of wireless communication performed by a user equipment (UE), comprising:
   receiving data or control signaling on one or more first sidelink channels on a first component carrier of a set of sidelink carriers;
   receiving data or control signaling on one or more second sidelink channels on a second component carrier of the set of sidelink carriers; and
   transmitting, on a designated set of component carriers, hybrid automatic repeat request (HARQ) feedback corresponding to the data or control signaling on the one or more first sidelink channels and the data or control signaling on the one or more second sidelink channels,
      the designated set of component carriers including:
         only the first component carrier, or
         the second component carrier and one or more other component carriers.

26. The method of claim 25, wherein the HARQ feedback is based at least in part on a semi-static HARQ codebook.

27. The method of claim 25, wherein the HARQ feedback is based at least in part on a dynamic HARQ codebook.

28. A method of wireless communication performed by a first user equipment (UE), comprising:
   transmitting, to a second UE, data or control signaling on one or more first sidelink channels on a first component carrier of a set of sidelink carriers;

transmitting, to the second UE, data or control signaling on one or more second sidelink channels on a second component carrier of the set of sidelink carriers; and
receiving, from the second UE and on a designated set of component carriers, hybrid automatic repeat request (HARQ) feedback corresponding to the data or control signaling on the one or more first sidelink channels and the data or control signaling on the one or more second sidelink channels,
the designated set of component carriers including:
only the first component carrier, or
the second component carrier and one or more other component carriers.

29. The method of claim 28, wherein the HARQ feedback is based at least in part on a semi-static HARQ codebook.

30. The method of claim 28, wherein the HARQ feedback is associated with a fixed slot offset.

\* \* \* \* \*